United States Patent
Park et al.

(10) Patent No.: US 10,571,093 B2
(45) Date of Patent: Feb. 25, 2020

(54) APPARATUS FOR SUPPORTING OPTICAL REFLECTOR

(71) Applicant: JAHWA electronics Co., Ltd., Chungcheongbuk-do (KR)

(72) Inventors: Chul Soon Park, Chungcheongnam-do (KR); Jung Min Son, Incheon (KR); Min Gyu Suh, Seoul (KR)

(73) Assignee: JAHWA electronics Co., Ltd., Chungcheongbuk-do (KR)

( * ) Notice: Subject to any disclaimer, the term of this patent is extended or adjusted under 35 U.S.C. 154(b) by 66 days.

(21) Appl. No.: 15/860,959

(22) Filed: Jan. 3, 2018

(65) Prior Publication Data

US 2018/0224088 A1    Aug. 9, 2018

(30) Foreign Application Priority Data

Feb. 7, 2017    (KR) .......................... 10-2017-0016655

(51) Int. Cl.
| | | |
|---|---|---|
| *F21V 7/00* | (2006.01) | |
| *G02B 5/08* | (2006.01) | |
| *F21V 14/04* | (2006.01) | |
| *G02B 5/04* | (2006.01) | |

(Continued)

(52) U.S. Cl.
CPC .......... *F21V 7/0066* (2013.01); *F21V 7/0008* (2013.01); *F21V 7/0025* (2013.01); *F21V 14/04* (2013.01); *G02B 5/04* (2013.01); *G02B 5/08* (2013.01); *G02B 7/1828* (2013.01); *G02B 27/646* (2013.01)

(58) Field of Classification Search
CPC ...... G02B 7/18; G02B 7/1805; G02B 26/085; G02B 26/0833; G02B 26/0816
See application file for complete search history.

(56) References Cited

U.S. PATENT DOCUMENTS

| | | | | |
|---|---|---|---|---|
| 6,065,180 A | * | 5/2000 | Scholl ................... | B60S 1/4006 15/250.32 |
| 2003/0048550 A1 | * | 3/2003 | Atsumi ................ | G02B 7/1805 359/819 |

(Continued)

FOREIGN PATENT DOCUMENTS

| | | |
|---|---|---|
| JP | H06-050012 U | 7/1994 |
| JP | 2007-041121 A | 2/2007 |
| JP | 2013-057764 A | 3/2013 |

(Continued)

OTHER PUBLICATIONS

Machine-generated English language translation of International Search Report dated Feb. 13, 2018, in corresponding International application No. PCT/KR2017/013475; 2 pages.

*Primary Examiner* — Noam Reisner
(74) *Attorney, Agent, or Firm* — Maier & Maier, PLLC

(57) ABSTRACT

An apparatus for supporting an optical reflector to change a path of light and introduce the light to a lens includes an inclined unit configured to support a reflective surface of the optical reflector; a guide wall formed at a side of the inclined unit to support a side surface of the optical reflector; a guide opening formed in the guide wall; and a support member made of a material different from the material of the optical reflector and inserted into the guide opening so that an inner surface of the support member is fixedly coupled to the side surface of the optical reflector.

7 Claims, 5 Drawing Sheets

(51) Int. Cl.
*G02B 27/64* (2006.01)
*G02B 7/182* (2006.01)

(56) References Cited

U.S. PATENT DOCUMENTS

2016/0259094 A1    9/2016  Aschwanden et al.
2019/0121103 A1*   4/2019  Bachar ............... G02B 13/0065

FOREIGN PATENT DOCUMENTS

JP    2013-167818 A    8/2013
WO    2016/055253 A2   4/2016

* cited by examiner

APPARATUS FOR SUPPORTING OPTICAL REFLECTOR

TECHNICAL FIELD

The present disclosure relates to a structure or apparatus for supporting an optical reflector, and more particularly, to an apparatus for supporting an optical reflector, which may more effectively support the optical reflector by using a support member made of a material different from that of the optical reflector and an improved structure coupled to the support member.

BACKGROUND

In accordance with the development of hardware technology, user environment and the like, various and complex functions are integrally implemented in a portable terminal (a mobile terminal) such as a smart phone in addition to basic functions for communication.

A typical example is a camera module in which various functions such as autofocus (AF), optical image stabilization (OIS) are implemented. In recent years, voice recognition, fingerprint recognition, iris recognition or the like is also mounted to a mobile terminal for certification or security. Also, it is recently attempted to mount a zoom lens having a plurality of lenses so that a focus distance may be adjusted in a variable way.

Meanwhile, a camera for generating an image of a subject using an image pickup device such as a charge-coupled device (CCD) or a complementary metal-oxide semiconductor (CMOS) uses a method of directly introducing light of the subject toward a lens or a method of changing a path of light (by reflection, refraction or the like) according to an optical or structural design and introducing the light to the lens.

In order to change a path of light, an optical reflector (a prism, a mirror or the like) may be installed at a front end of the lens. If the optical reflector is used, the light path may be changed easily. However, due to the physical characteristics of the optical reflector generally made of glass material, cracks are likely to occur just by a small impact, which may cause deviation or failure in the optical alignment, and thus the performance of the camera may be easily deteriorated.

The optical reflector may also be used to change the path of light in a zoom lens actuator mounted to a mobile phone (a smart phone). In this case, since the space for installation is not enough, it is difficult to apply a delicate and complicated structure for physically supporting the optical reflector. For this reason, the optical reflector may be more affected by external impacts or the like.

Moreover, since the mobile terminal such as a smart phone is frequently used by a user, the above problems may occur more frequently.

SUMMARY

The present disclosure is designed to solve the problems of the related art, and therefore the present disclosure is directed to providing an apparatus for supporting an optical reflector, which may effectively solve a problem that the optical reflector is deviated from a regular location or broken, just by applying a simple structure using a support member made of a material different from that of the optical reflector.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

In one aspect of the present disclosure, there is provided an apparatus for supporting an optical reflector to change a path of light and introduce the light to a lens, the apparatus comprising: an inclined unit configured to support a reflective surface of the optical reflector; a guide wall formed at a side of the inclined unit to support a side surface of the optical reflector; a guide opening formed in the guide wall; and a support member made of a material different from the material of the optical reflector and inserted into the guide opening so that an inner surface of the support member is fixedly coupled to the side surface of the optical reflector.

The support member of the present disclosure may be made of any one material selected from the group consisting of plastic, rubber, gum, metal, and mixtures thereof, different from the material of the guide wall.

In addition, the guide wall of the present disclosure may be formed at both side portions of the inclined unit to support both side surfaces of the optical reflector, respectively, and the support member of the present disclosure may have a shape corresponding to the guide opening.

In addition, two or more guide openings may be formed in the guide wall in the present disclosure, and the guide opening may be shaped corresponding to the side surface of the optical reflector.

More preferably, the apparatus for supporting an optical reflector according to the present disclosure may further comprise a groove rail provided in a direction different from the direction of the inclined unit to support a plurality of balls; and a magnet to which an electromagnetic force of an external coil is transferred. Here, the groove rail may have a rounded shape According to an embodiment of the present disclosure, just by using a simple structure in which a support member made of a material different from that of the optical reflector supports optical reflector at a side of the optical reflector, it is possible to implement an apparatus for supporting an optical reflector, which has robust endurance against external environments such as impact, collision, falling or the like without deteriorating the optical performance.

The apparatus for supporting an optical reflector according to the present disclosure may have a simple and light design, which is more suitable for a small portable terminal such as a smart phone. In particular, the apparatus for supporting an optical reflector according to the present disclosure may be optimized for an actuator having an OIS function by moving an optical reflector.

BRIEF DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
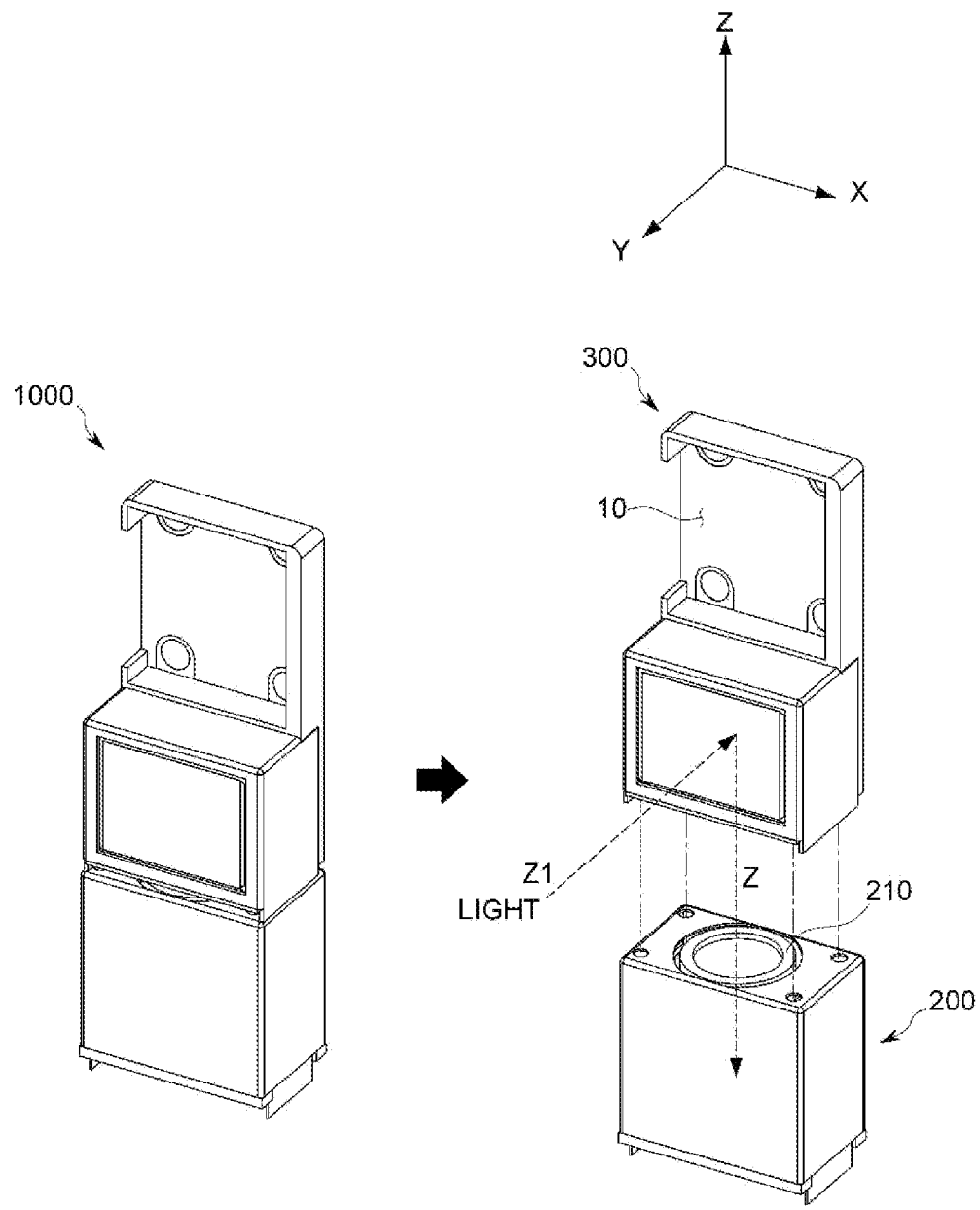
FIG. 1 is a diagram showing an overall configuration of an actuator to which a supporting apparatus according to the present disclosure is applied.

FIG. 1 is a diagram showing an overall configuration of an actuator 1000 to which an apparatus 100 for supporting an optical reflector (hereinafter, referred to as a 'supporting apparatus') according to the present disclosure is applied.

The actuator 1000 shown in FIG. 1 includes a driving device 300 for moving an optical reflector based on one axis or two axes to perform an OIS function, and a lens driving module 200 connected to the driving device 300 and having a zoom lens or the like to perform an AF function and/or an OIS function.

The supporting apparatus 100 (FIG. 2) of the present disclosure may be implemented as an independent device or an internal structure or device that constitutes the driving device 300, which is one component of the actuator 1000.

According to an embodiment, the driving device 300 may perform the OIS function in at least one of two directions (X-axis and Y-axis) perpendicular to an optical axis (Z-axis).

If the driving device 300 performs the OIS function along both axes (X-axis and Y-axis), the lens driving module 200 may be configured to perform only the AF function. Also, if the driving device 300 performs the OIS function along any one axis (X-axis or Y-axis), the lens driving module 200 may be configured to perform the OIS function along the other axis (Y-axis or X-axis) or to perform the AF function along with the OIS function.

The lens 210 may be a single lens, or a zoom lens in which a plurality of lenses or a lens group or an optical member such as of a prism, a mirror or the like is included therein. If the lens 210 is configured as a zoom lens or a zoom lens barrel, the lens may be shaped to elongate in a vertical direction (Z-axis direction).

According to an embodiment, the actuator 1000 to which the supporting apparatus 100 of the present disclosure is applied may be configured such that a light of a subject or the like is not directly input to the lens 210, but the light is input to the lens 210 after the path of the light is changed (refracted, reflected or the like) by an optical reflector 400 (FIG. 2) installed at the supporting apparatus 100 of the present disclosure, which includes in the driving device 300.

In FIG. 1, the path of light incoming from the outside is Z1, and the path of light refracted or reflected by the optical reflector 400 and introduced to the lens 210 is Z. In the following description, Z is referred to as an optical axis or an optical axis direction.

Also, though not shown in the figures, an imaging device such as a CCD or a CMOS that converts a light signal into an electric signal may be provided below the lens 210 based on the optical axis direction, and a filter for blocking or transmitting a light signal of a specific frequency band may be provided together.

As shown in FIG. 1, the driving device 300 may further include a lens mounting space 10. In this space 10, a lens or the like having an optical characteristic different from that of the lens 210 may be mounted. In some embodiments, the lens mounting space 10 may not be provided.

Figure 2:
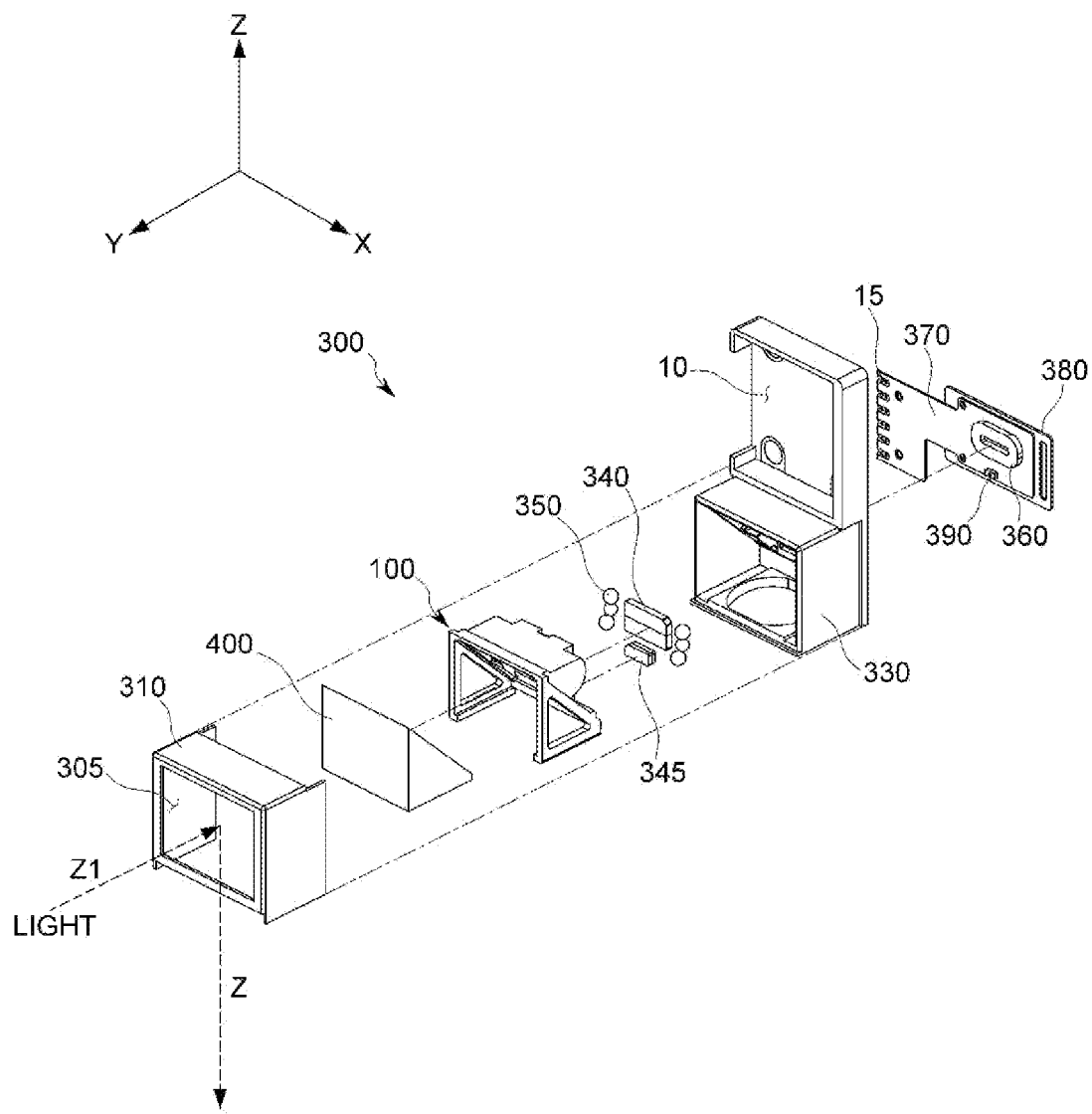
FIG. 2 is a diagram showing a configuration related to the supporting apparatus of the present disclosure.

FIG. 2 is a diagram showing the supporting apparatus 100 of the present disclosure and a configuration related to the supporting apparatus 100 of the present disclosure.

The supporting apparatus 100 of the present disclosure may be implemented as an independent apparatus as described above, or as a component, structure or module in the driving device 300 as shown in FIG. 2.

The driving device 300 depicted in FIG. 2 may include the supporting apparatus 100 of the present disclosure, a case 310 having an open portion 305, an optical reflector 400, a base frame 330, a magnet 340, a ball 350, and a coil 170.

As shown in FIG. 2, if the light of the path Z1 is introduced through the open portion 305 of the case 310, the optical reflector 400 of the present disclosure changes (refracts or reflects) the path of the introduced light to the optical axis direction (Z) so that the light is introduced toward the lens 210.

The optical reflector 400 may be a mirror or a prism, or a combination thereof, and may be implemented using various members capable of changing the light introduced from the outside to the optical axis direction. The mirror or prism may be made of glass material to improve the optical performance.

The driving device 300 depicted in FIG. 2 may be configured so that light is refracted by the optical reflector 400 and introduced toward the lens 210. Thus, the lens 210 may be installed in a length direction without being installed in a thickness direction of the mobile terminal. For this reason, this design does not increase the thickness of the mobile terminal and thus may be optimized for a small and slim design of the mobile terminal.

The optical reflector 400 mounted to the supporting apparatus 100 of the present disclosure is installed in the direction of the open portion 305 through which the light is introduced in the supporting apparatus 100, namely in a front direction along the Y-axis direction, based on FIG. 2.

The supporting apparatus 100 of the present disclosure may be provided at a fixed position. However, in some embodiments, it is also possible that the supporting apparatus 100 is capable of moving or rotating based on the base frame 330 for the OIS function, as shown in FIG. 2.

Hereinafter, an embodiment in which the supporting apparatus 100 is rotated for the OIS function will be briefly described.

As well known in the art, the OIS function is implemented by reversely moving the lens in a direction of correcting camera shaking caused by hand trembling. In the embodiment, however, the optical reflector 400 is moved reversely to perform the OIS function, instead of reversely moving the lens.

For this, a magnet 340 for receiving a driving force by an electromagnetic force may be installed at the supporting apparatus 100 of the present disclosure. The magnet 340 is used for the OIS function, and as shown in FIG. 2, the magnet 340 may be installed in a direction in which the optical reflector 400 is not installed so as to increase the structural efficiency and not to disturb the light path.

The magnet 340 receives the driving force by the electromagnetic force from an OIS coil 360, and the supporting apparatus 100 of the present disclosure at which the magnet 340 is installed moves based on the base frame 330 by the driving force.

A ball 350 may be positioned between the supporting apparatus 100 of the present disclosure and the base frame 330. In this case, the supporting apparatus 100 of the present disclosure is configured to move (rotate) in a point contact with the ball 350.

The ball 350 makes the supporting apparatus 100 and the base frame 330 be spaced apart at a predetermined interval (corresponding to a diameter of the ball) and induces the supporting apparatus 100 to be moved more flexible due to a minimized frictional force caused by the point contact.

Figure 5:
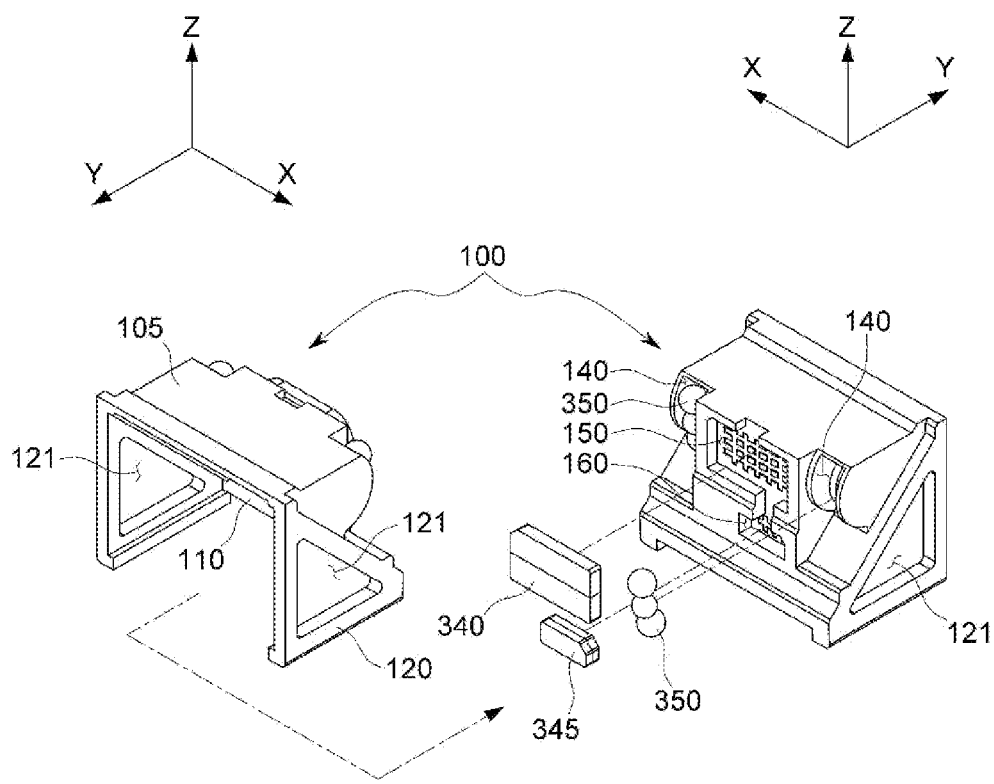
FIG. 5 is a diagram showing a detailed configuration at a rear side of the supporting apparatus according to the present disclosure.

The ball 350 may be implemented as a ball group in which a plurality of balls are arranged in rows as shown in FIGS. 2 and 5, so as to effectively support the supporting apparatus 100 and effectively guide the rotational movement of the supporting apparatus 100. In addition, two ball groups composed of the plurality of balls 350 may be provided at positions symmetrical to each other with respect to the vertical direction at the center of the supporting apparatus 100.

The yoke 380 made of a magnetic material concentrates the electromagnetic force of the OIS coil 360 and generates an attraction force to the magnet 340 provided at the supporting apparatus 100.

Due to the generated attraction force, the magnet 340, namely the supporting apparatus 100 including the magnet 340, is pulled in the direction of the yoke 380 (a backward direction along Y-axis in FIG. 2), and thus the supporting apparatus 100 maintains the point contact with the ball 350. In addition, if the power supplied to the OIS coil 360 is interrupted, the yoke 380 also functions to restore the supporting apparatus 100 to an original reference position.

The OIS coil 360 described above is loaded on a circuit board (FPCB) 370, and a hall sensor 390 for sensing a position of the magnet 340 (or, the supporting apparatus 100 including the magnet) using the hall effect may be provided. In order to enhance the position sensing efficiency of the hall sensor 390, a sensing magnet 345 may also be provided to the supporting apparatus 100.

The hall sensor 390 may be implemented as a chip integrated with a driving control unit. The driving control unit performs feedback control so that the power having magnitude and direction corresponding to the signal of the hall sensor 390 is applied to the OIS coil 360.

An end 15 of the circuit board 370 is a connector for power supply to the OIS coil 360, drive control, data communication, and the like, and the end 15 may be exposed to the outside for effective interfacing with an external device, as shown in FIG. 2.

Figure 3:
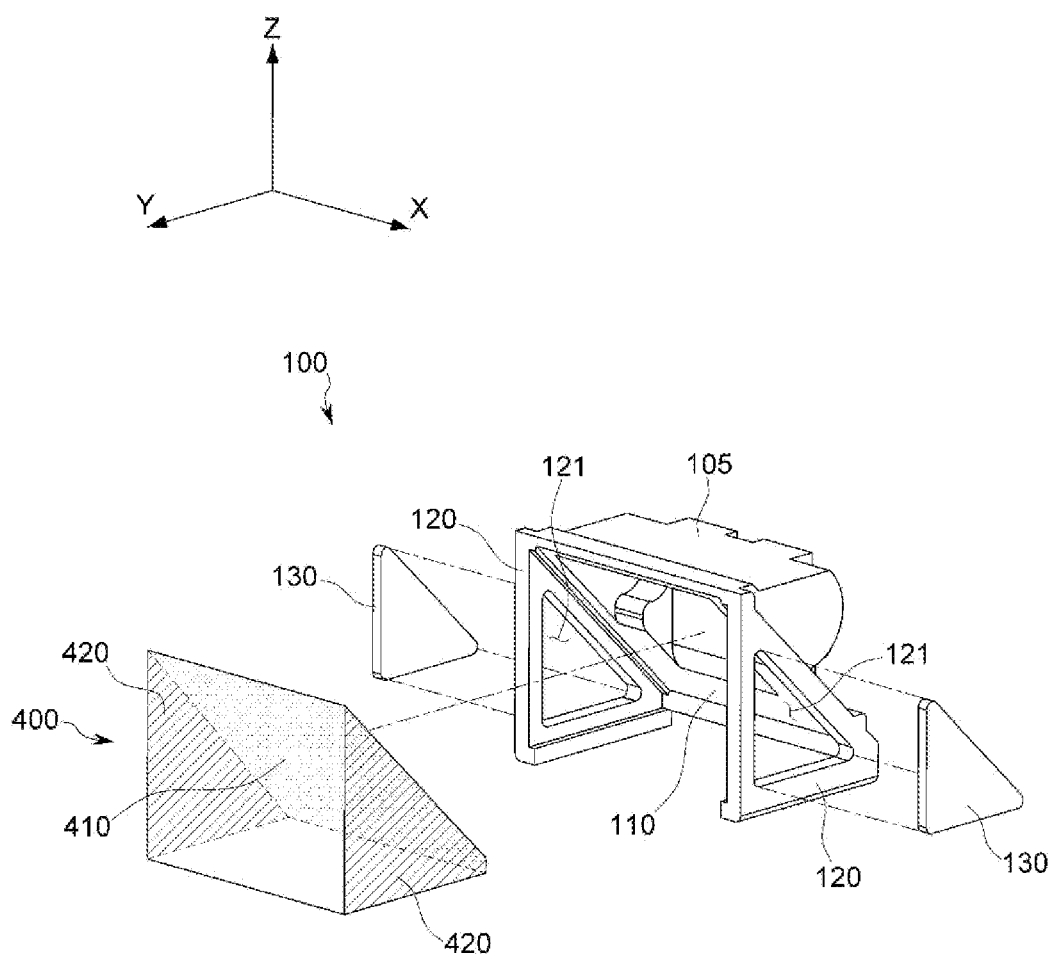
FIG. 3 is a diagram showing a detailed configuration of a supporting apparatus according to an embodiment of the present disclosure.

FIG. 3 is a diagram showing a detailed configuration of a supporting apparatus 100 according to an embodiment of the present disclosure.

As described above, the supporting apparatus 100 of the present disclosure corresponds to a device for supporting the optical reflector 400 that changes the path of light so that the light is introduced into the lens 210 (FIG. 1).

As shown in FIG. 3, the supporting apparatus 100 of the present disclosure may include a body 105, an inclined unit 110, a guide wall 120, a guide opening 121, and a support member 130.

The inclined unit 110 of the supporting apparatus 100 is formed in the body 105 along the direction in which an exterior light is introduced, and the inclined unit 110 supports a reflective surface 410 of the optical reflector 400.

Since the reflective surface 410 of the optical reflector 400 is a surface on which optical characteristics such as light reflection or refraction are concentrated, regions physically coming into contact with the inclined unit 110 of the supporting apparatus 100 and the reflective surface 410 of the optical reflector 400 are preferably limited to an outer circumferential portion of the reflective surface 410.

The guide wall 120 of the supporting apparatus 100 is formed on one side or both sides of the inclined unit 110 to support a side surface 420 of the optical reflector 400.

In this regard, it may also be considered to bond the entire side surface of the optical reflector to the left and right sidewalls of the structure that supports the optical reflector. However, in this case, the bonding force is weakened so that the optical reflector is detached or an external impact may be easily transferred to the optical reflector, causing cracks in the optical reflector or damaging the optical reflector.

The present disclosure is directed to overcoming this problem and provides a supporting apparatus 100 which may remarkably reduce the frequency of occurrence of the above problem by means of a simple structural change.

For this, in the present disclosure, the guide opening 121 is formed in the guide wall 120, and the support member 130 to the inner surface of which the side surface 420 of the optical reflector 400 is fixedly coupled by bonding is inserted into the guide opening 121.

The support member 130 may be made of a material different from that of the guide wall 120 and the optical reflector 400 in order to increase the bonding force or the fixing force. Further, if the body 105 and the guide wall 120 of the supporting apparatus 100 are made of a plastic material, the support member 130 may be made of a material that is different from the plastic material and has superior adhesion to the optical reflector 400.

In addition, the support member 130 may also be made of a material such as rubber or gum or a plastic material with a low rigidity. However, if such a material is used, dust may be generated due to the separation of minute pieces, which may deteriorate optical characteristics of the optical reflector 400, the lens 210 or the image sensor (CMOS or the like).

Thus, it is most preferable that the support member 130 is made of a metal material such as SUS in order to increase the bonding force with the optical reflector 400 and prevent dust from being generated.

Further, in order to enhance the physical properties of the support member 130, the support member 130 may be made of a mixture of two or more materials selected from plastic, rubber, gum and metal materials. In addition, the support member 130 may be made of different materials at physically contacting portions thereof. For example, the inner surface of the support member 130 which makes contact with the optical reflector 400 may be made of a metal material, and the portion of the support member 130 which makes contact with the guide wall 120 may be made of a plastic material, which is different from the material of the guide wall 120. In this case, it is possible to increase the fixing force and improve the supporting force for supporting the optical reflector 400 simultaneously.

Meanwhile, in some embodiments, the guide wall 120 having the guide opening 121 may be formed only at one side of the inclined unit 110. However, it is preferred that the guide wall 120 having the guide opening 121 is provided at both sides of the inclined unit 110 as shown in the figure so that the right and left sides of the optical reflector 400 are effectively supported at the same time.

In addition, the support member 130 has a shape corresponding to the guide opening 121 so that a clearance is not formed at the optical reflector 400 which is supported.

As described above, in the present disclosure, the optical reflector 400 may be more effectively supported by using the coupling force between different kinds of materials having better bonding strength, and the influence caused by an external impact on the optical reflector 400 may be minimized by absorbing or distributing the external impact by means of a physical structure change for supporting the optical reflector 400.

The supporting member 130 of the present disclosure may have a shape corresponding to the side surface of the optical reflector 400 as shown in the figure in order to further enlarge the area fixed and coupled to the optical reflector 400 and more effectively support the optical reflector 400. Since the side surface of the optical reflector 400 generally has an isosceles triangular cross-section, the support member 130 of the present disclosure may also be implemented in an isosceles triangle shape corresponding thereto.

Further, the sectional area of the support member 130 may also correspond to the area of the side surface of the optical reflector 400 as much as possible and be implemented slightly smaller than the lateral width of the optical reflector 400 in order to ensure organic coupling with other components.

Figure 4A:
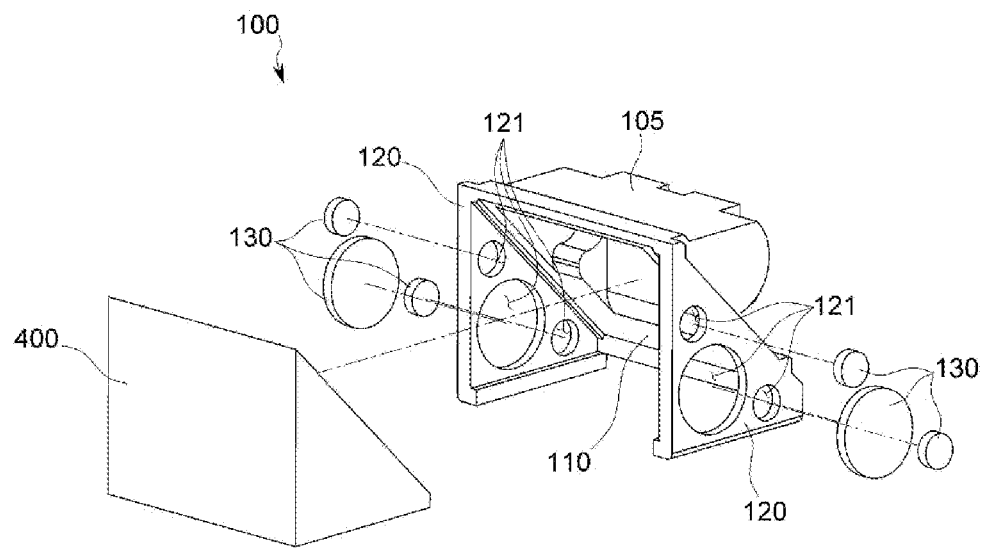
FIG. 4A is a diagram showing a detailed configuration of a supporting apparatus according to another embodiment of the present disclosure.
Figure 4B:
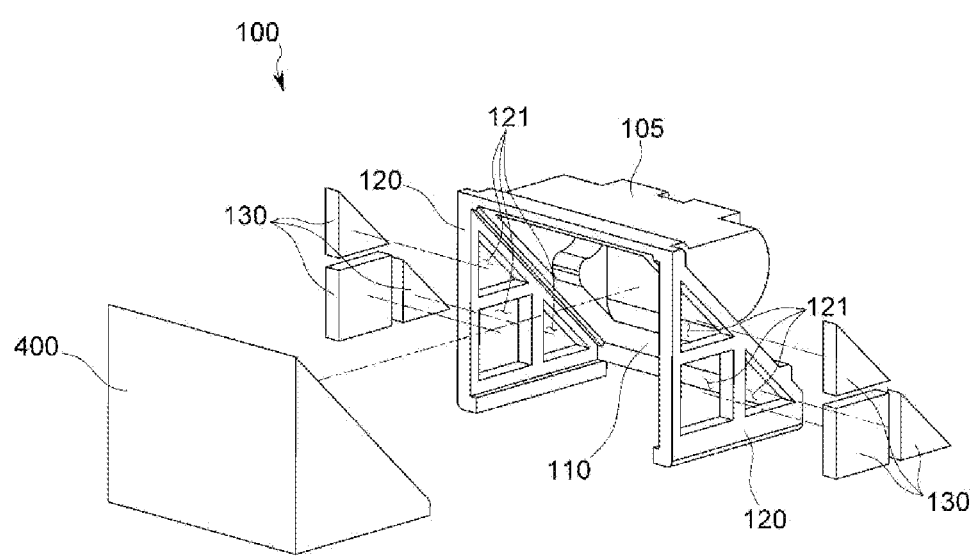
FIG. 4B is another diagram showing a detailed configuration of a supporting apparatus according to another embodiment of the present disclosure.

FIG. 4 is a diagram showing a detailed configuration of a supporting apparatus 100 according to another embodiment of the present disclosure.

As shown in FIG. 4, the guide opening 121 of the supporting apparatus 100 according to the present disclosure may be formed in various shapes depending on embodiments, and the number of the guide openings 121 may also be variously selected.

In these embodiments, the support member 130 and the guide opening 121 may also be formed to support the side surface of the optical reflector 400 in as a wide area as possible.

In addition, since cracks are firstly generated at an outer circumference of the optical reflector 400, in order to prevent the cracks structurally, the support members 130 and the guide openings 121 provided in plural may form an overall shape corresponding to the shape of the side surface of the optical reflector 400 (for example, an isosceles triangular shape), and may be disposed to support an outer circumference of the side surface of the optical reflector 400 as much as possible.

FIG. 4 is just one of various embodiments of the present disclosure, and thus the shape and number of the support members 130 and the guide openings 121 may be selected different from the above embodiment depicted in FIG. 4, as long as the technical features of the present disclosure may be implemented.

FIG. 5 is a diagram showing a detailed configuration at a rear side of the supporting apparatus 1200 according to the present disclosure.

As shown in FIG. 5, the groove rail 140 of the present disclosure may be provided at a side opposite to the inclined unit 110, namely at a side opposite to the inclined unit 110 based on the Y-axis. In some embodiments, the groove rail 140 may be provided at the top surface based on FIG. 5.

The groove rail 140 is configured to guide the movement of the supporting apparatus 100 of the present disclosure relative to the base frame 330, and the groove rail 140 guides and supports a plurality of balls 350 disposed between the supporting apparatus 100 of the present disclosure and the base frame 330 in a row.

A groove rail having a shape corresponding to the groove rail 140 may also be formed at the base frame 330, and the balls 350 are disposed between the groove rail of the base frame 330 and the groove rail 140 of the supporting apparatus 100.

By using this structure, the supporting apparatus 100 of the present disclosure moves along the path formed on the groove rail 140 with reference to the base frame 330 in a point contact with the balls 350.

In order to effectively perform optical image stabilization by changing the path Z of the light entering the lens by means of the optical reflector 400, the groove rail 140 may have a rounded shape and further may have an appropriate curvature. By using this configuration, the supporting apparatus 100 of the present disclosure is rotated.

If the supporting apparatus 100 of the present disclosure is rotated as described above, the angle at which the external light is reflected by the optical reflector 400 is changed, and by means of such an angle change, the correcting movement (optical image stabilization) is performed in a specific axial direction (Y-axis in the embodiment of FIG. 5) based on the lens.

As described above, the supporting apparatus 100 is rotated by an electromagnetic force between the OIS coil 360 (FIG. 2) and the magnet 340. Here, as shown in FIG. 5, a magnet mounting space 150 may be formed at the rear surface of the supporting apparatus 100 so that the magnet 340 is mounted thereto.

If a sensing magnet 345 for hall sensing is additionally provided, a mounting space 160 may be formed below the magnet mounting space 150 so that the sensing magnet is mounted thereto.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

The accompanying drawings for explaining and illustrating the embodiments of the present disclosure may be somewhat exaggerated in order to emphasize or highlight the features of the present disclosure, but it should be understood that various modifications can be made by those having ordinary skill in the art without departing from the scope of the present invention.

| Reference Signs | |
| --- | --- |
| 100: apparatus for supporting an optical reflector | |
| 105: body | 110: inclined unit |
| 120: guide wall | 121: guide opening |
| 130: support member space | 140: groove rail |
| 150: magnet mounting | 160: sensing magnet mounting space |
| 210: lens | 340: magnet |

-continued

| Reference Signs | |
|---|---|
| 350: ball | 360: OIS coil |
| 370: circuit board | 380: yoke |

What is claimed is:

1. An apparatus for supporting an optical reflector to change a path of light and introduce the light to a lens, the apparatus comprising:
    a magnet mounting space for mounting a magnet to which an electromagnetic force of an external coil is transferred;
    an inclined unit configured to support a reflective surface of the optical reflector;
    a guide wall formed at a side of the inclined unit to support a side surface of the optical reflector;
    a guide opening formed in the guide wall as being perforated; and
    a support member made of a material different from the material of the optical reflector and the material of the guide wall, and the support member is inserted into the perforated guide opening so that an inner surface of the support member is fixedly coupled to the side surface of the optical reflector,
    wherein the side surface of the optical reflector is fixedly supported by the inner surface of the support member with a coupling force between different kinds of the materials of the support member, the guide wall and the optical reflector,
    wherein the guide wall is formed at both side portions of the inclined unit to support both side surfaces of the optical reflector, respectively, and
    wherein the material of the support member includes a resilient material.

2. The apparatus for supporting an optical reflector according to claim 1,
    wherein the support member has a shape corresponding to the guide opening.

3. The apparatus for supporting an optical reflector according to claim 1,
    wherein two or more guide openings are formed in the guide wall.

4. The apparatus for supporting an optical reflector according to claim 1,
    wherein the guide opening is shaped corresponding to the side surface of the optical reflector.

5. The apparatus for supporting an optical reflector according to claim 1, further comprising:
    a groove rail provided in a direction different from the direction of the inclined unit to support a plurality of balls.

6. The apparatus for supporting an optical reflector according to claim 5,
    wherein the groove rail has a rounded shape.

7. The apparatus for supporting an optical reflector according to claim 1,
    wherein the support member is made of any one material selected from the group consisting of plastic, rubber, gum, and mixtures thereof, different from the material of the guide wall.

\* \* \* \* \*